United States Patent [19]
Gidge

[11] Patent Number: 5,622,004
[45] Date of Patent: Apr. 22, 1997

[54] SELF-WATERING GROWING SYSTEMS

[75] Inventor: Lester Gidge, Nashua, N.H.

[73] Assignee: Nashua Industrial Machine Corp., Nashua, N.H.

[21] Appl. No.: 273,732

[22] Filed: Jul. 12, 1994

[51] Int. Cl.[6] ........................................................ A01G 9/04
[52] U.S. Cl. ........................................................ 47/71; 47/81
[58] Field of Search .................................. 47/81 N, 81 S, 47/81 R, 81 D, 64, 71, 66 R

[56] References Cited

U.S. PATENT DOCUMENTS

| | | | |
|---|---|---|---|
| 1,179,855 | 4/1916 | McKinnon | 47/81 S |
| 1,450,633 | 4/1923 | Hudson | 47/81 S |
| 4,268,994 | 5/1981 | Urai | 47/67 R |
| 4,299,054 | 11/1981 | Ware | 47/64 |
| 4,528,774 | 7/1985 | Skaife | 47/86 |
| 4,829,709 | 5/1989 | Centafanti | 47/81 S |

FOREIGN PATENT DOCUMENTS

| | | | |
|---|---|---|---|
| 649568 | 6/1964 | Belgium | 47/81 S |
| 2610613 | 9/1977 | Germany | 47/81 |
| 66056 | 8/1913 | Switzerland | 47/81 D |
| 291411 | 6/1953 | Switzerland | 47/81 S |
| 2045043 | 10/1980 | United Kingdom | 47/81 R |

*Primary Examiner*—Terry Lee Melius
*Assistant Examiner*—Joanne C. Downs
*Attorney, Agent, or Firm*—Fitzpatrick, Cella, Harper & Scinto

[57] ABSTRACT

A growing system, comprising a container for liquid, a container for growing medium and a wick for transporting water between them, provides a low maintenance, low water usage, self-watering planter. The wick, cut from an extended, continuously manufactured length, may comprise a plastic net and omni-directional, long-fiber sphagnum moss.

6 Claims, 7 Drawing Sheets

SELF-WATERING GROWING SYSTEMS

BACKGROUND OF THE INVENTION

This invention relates to self-watering growing systems. These typically include a growing medium, a reservoir of liquid and a means for transporting the liquid to the growing medium.

Proposals for self-watering systems that consist of automatic pumping or gravity feeding systems are wasteful. They may require energy to run. They also may deliver too much water, which is unhealthy for the plants, or they may require expensive sensing and control systems. If a watering system directs water onto the plants and/or onto the upper surface of the soil, the plant roots may tend toward the surface and remain shallow, which may also be unhealthy for the plants and may deplete the surface of nutrients, limiting the plants' growth. Such surface watering systems also lead to unnecessary evaporation directly into the atmosphere.

Some self-watering systems have been proposed in which water has been led by wicking from a reservoir to soil beneath plants, but these have required too frequent liquid replenishment or other attention, and they have had problems of limited wicking ability, difficulty of mass production manufacture, limited water reservoir capacity, over or under moisturizing, non-uniform moisturizing, and other problems that are overcome or reduced by the present invention.

SUMMARY OF THE INVENTION

This invention includes a first container for holding growing medium. The growing medium is preferably a soilless mix, such as those known to commercial green house growers, and it may include fertilizer. The growing medium may include one or more of natural soil, loam, peat and the like.

This invention also includes a second container, which is a reservoir for liquid, preferably water, which may have liquid fertilizer added. The reservoir is preferably large enough to supply liquid to plants in the growing medium for weeks or months at a time without refilling the reservoir.

This invention also includes a wick for conveying the liquid to the first container from the second container. The wick of this invention is preferably made in a continuous process—ideally, a mass production process—into a single, long wick or strip which may be cut into shorter sections or pieces of convenient and appropriate length for use in planters and other growing systems. The wicks of this invention preferably include, as a capillary action transport means, long-fiber sphagnum moss in which the fibers are omni-directional or randomly oriented and held together as a wick. This random orientation may be imposed on the sphagnum moss by the manufacturing process described below. A preferred material for holding the sphagnum moss together in a strip as a wick is continuous netting, mesh or other grid-like material, preferably made of flexible plastic with openings that make up more than 50% of the surface area of the mesh, or more preferably more than 75%. The wick transports moisture to the growing medium, preferably to a lower portion of the growing medium, which may hold one or several plants.

Wicks of this invention are highly efficient. When moist, they may carry liquid in quantities to maintain plant growth in the combination of this invention to a height of 6 to 12 inches, or preferably at least 18 inches, above the surface of the liquid in a liquid reservoir. When used in combination with other features of the invention, such wicks make possible the use of large, deep reservoirs of liquid, and the system can support plant growth for extended periods of time without liquid replenishment. Specifically, systems of this invention can hold liquid in amounts ranging from about a gallon in small units to over 50 gallons in large units. Also, these systems can transport liquid to the plants even though the level of the liquid drops 6, 10 or more inches below its initial filled position, and can under normal climatic conditions in the northeast United States self-water plants over a period of weeks or months without replenishing the liquid supply. For example, if a plant can use ½ to 1 inch of water each week to flourish, and the reservoirs of this invention may be sixteen inches deep, then very roughly, a self-watering planter of the present invention can maintain that plant for four months or more without adding water. Periods of four to eight weeks without watering are easily obtainable, based on normal climatic conditions in the northeast United States.

The container holding the growing medium may be supported by the container holding the liquid, and the wick may then lead directly from the liquid to the bottom of the soilless mix while remaining inside the containers. It is also possible for one or more liquid containers to support a plurality of containers of growing medium. In one embodiment a plurality of growing medium containers are spaced around the upper edge of a liquid container. A wick may be led from each growing medium container to transport water to the growing medium. With such an arrangement, one such planter may be placed on top of another. Additional details of this and other embodiments are set forth below.

The present invention provides a complete, long-lasting, self-contained, self-watering system with less maintenance and less plant stress. There is no need with this invention to water the top surface of the soil repeatedly. Plants in growing systems of the present invention absorb moisture as they need it through their roots, reducing plant stress and reducing water loss directly to the atmosphere. The invention may be used indoors or out. In either location, it maintains proper moisture with low water usage.

DESCRIPTION OF THE PREFERRED EMBODIMENTS

Figure 1:
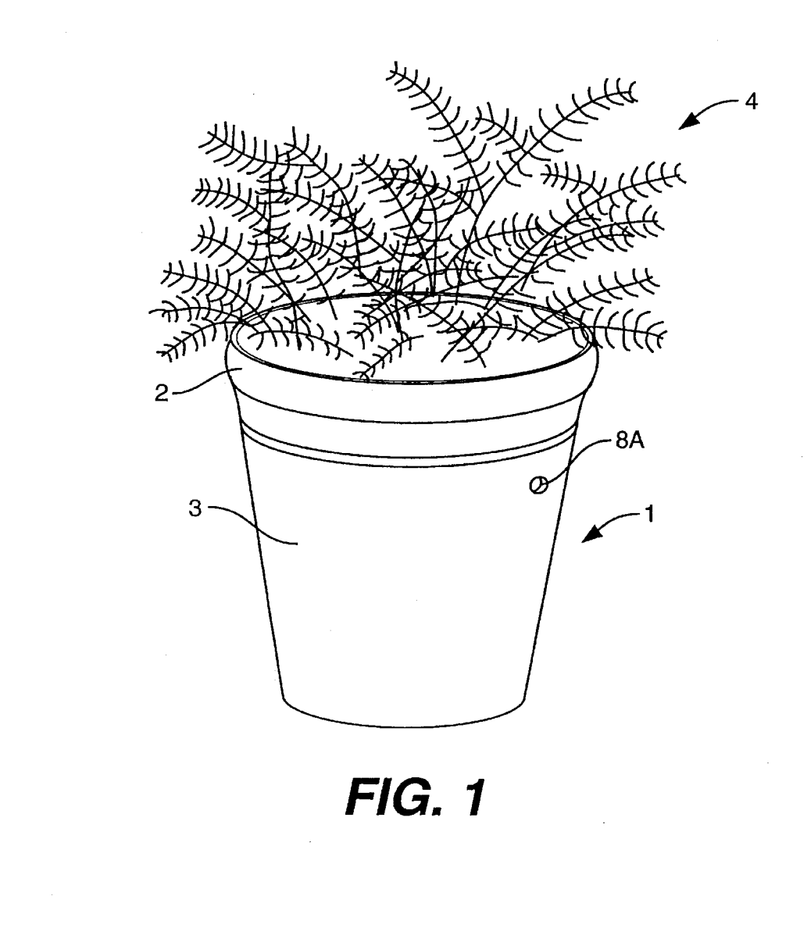
FIG. 1 is a perspective of one embodiment of a self-watering growing system of the present invention.
Figure 2:
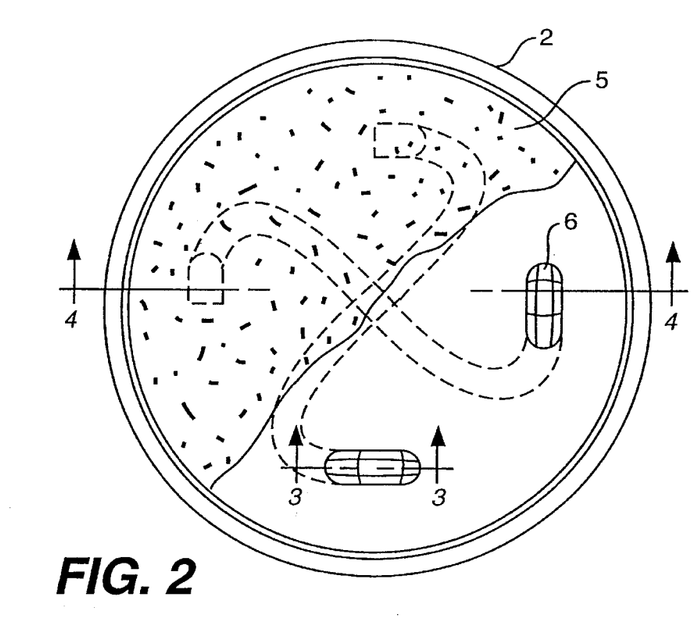
FIG. 2 is a top view of the embodiment of FIG. 1, partially cut away.
Figure 3:
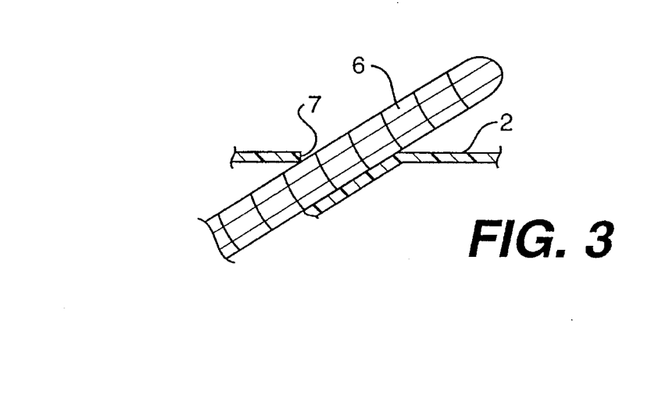
FIGS. 3 and 4 are cross sections of FIG. 2 along the lines 3—3 and 4—4 respectively.

A planter of the present invention, as shown in FIG. 1, includes a container for growing medium 2 and a container for liquid 3. Plants 4 are shown growing in the planter.

FIGS. 2 to 5 show the wicks 6, which contact water or other liquid 8 and soilless growing medium 5. In this embodiment two wicks are used, but this number will vary depending on the size of the unit from 1 to 8 or more wicks. Each end of each wick is led through one of four openings 7 in the bottom of container 2, where the wicks are held by staples (not shown) or other means. The wick is about 2 inches wide and extends into container 2 about 4 inches. The number of wicks and their precise dimensions may vary depending on the diameter of the planter and the climate where it is used. The middle of each wick loops downward into the liquid, and capillary action carries liquid to the growing medium 5. The growing medium may be a mixture of sphagnum peat moss, perlite and vermiculite such as sold by Premier Brands, Inc. of Canada under the name "Promix-BX" as a growing medium designed for cultivation of horticultural plants. A wetting agent of the kind sold to greenhouse and nursery growers, for example, AquaGro 2000, may also be added to ensure rapid and uniform wetting of the growing medium.

The container 2 has an opening 10, about an inch across, in its lower center (see FIG. 5) to permit excess liquid, such as rain water, to seep out into the reservoir below. The container 3 has an opening 8A in its side (see FIG. 4), which may be used to fill the container with liquid. This opening prevents water from flooding the container 2 and maintains an air space, preferably of about 1" in height, between the surface of the water 8 and the bottom of container 2. A convenient diameter of opening 8A is 1.38 inches, which will accept a common garden hose. The air space, and the location of the container 2 immediately above the water 8, are helpful in cooling the roots of the plants 4. The air in the space provides insulation, and evaporation of the water cools the bottom of the growing medium 5.

Figure 4:
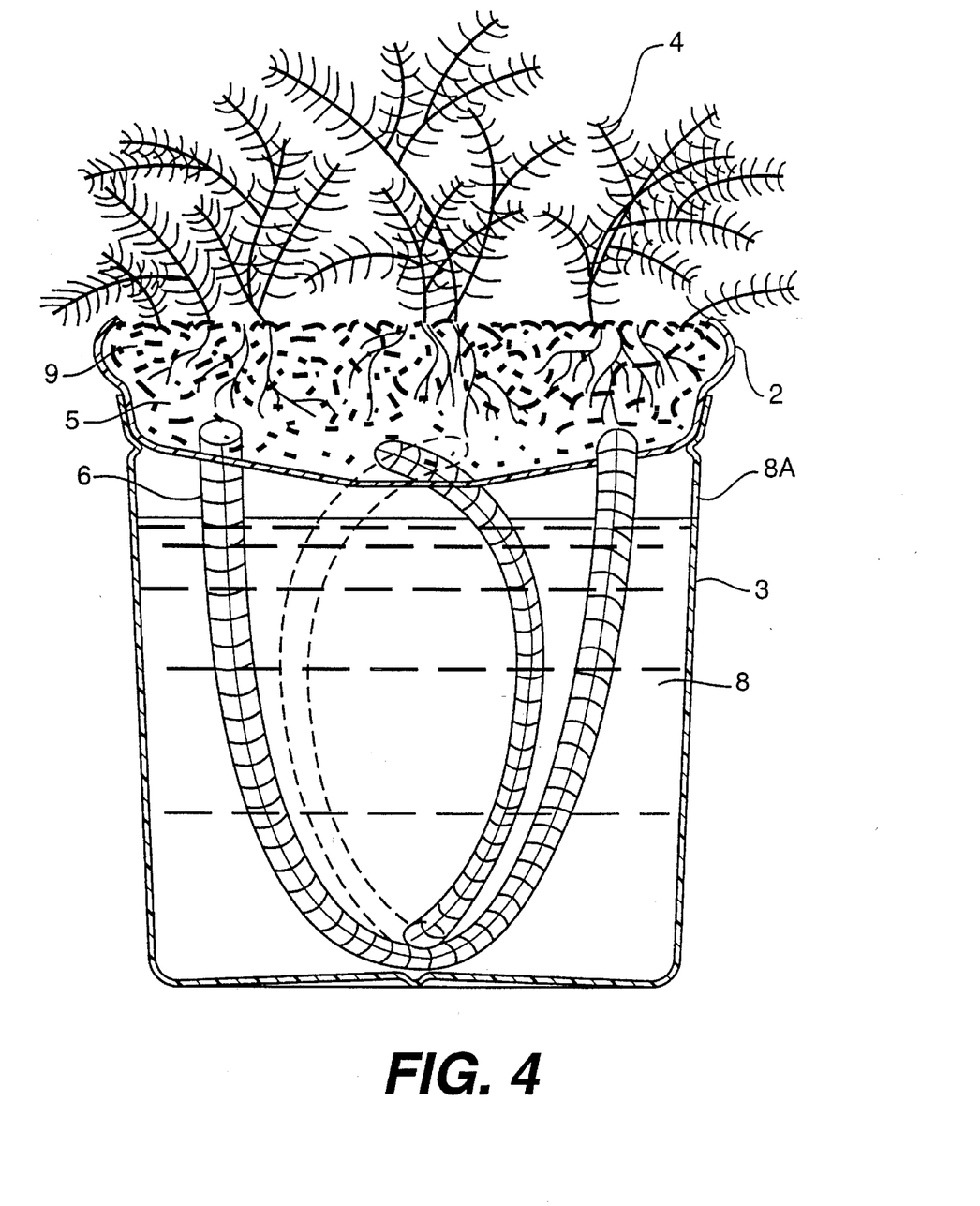
Figure 5:
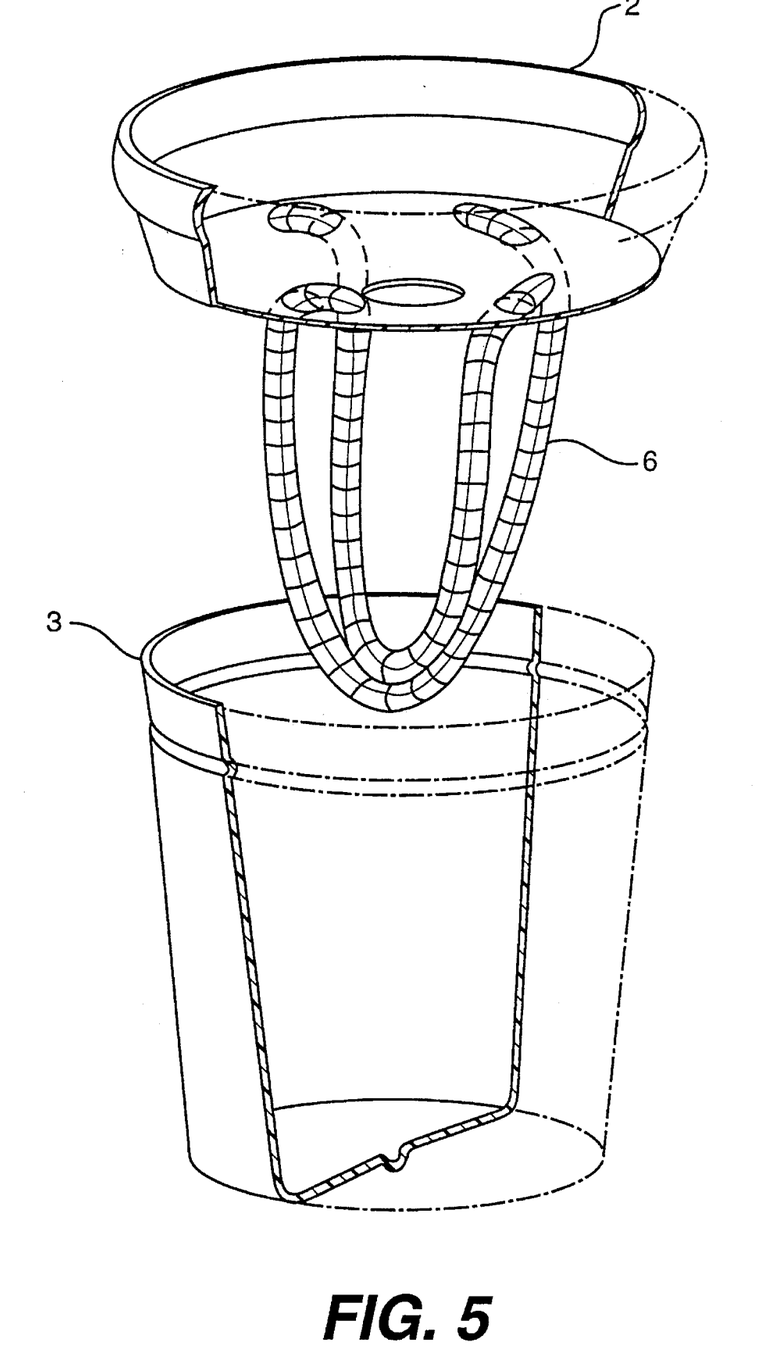
FIG. 5 is an exploded, partially cut away, perspective view of parts of the apparatus of FIG. 1.

We prefer to put bark chip or other mulch 9 on top of the growing medium 5. This helps reduce the escape of moisture directly from the soil into the atmosphere. This embodiment includes two containers, one of which is supported by and nests in the other in close contact, reducing the escape of moisture from the liquid reservoir. With this arrangement, the upper container 2 may be rotated as desired for complete exposure to sun or other light and even growth, while the reservoir, which may be extremely heavy because of the liquid in it, remains static. We prefer heights and sizes as follows:

| Approximate No. of Gallons of Liquid Held | Outside Diameter of Container 2 | Height of Containers 2 and 3 Assembled as in FIG. 4 |
| --- | --- | --- |
| 2 | 12½ inches | 12½ inches |
| 8 | 17½ | 17½ |
| 32 | 25½ | 22 |

The soilless growing medium is about 4 ½ or more inches deep, depending on the size of the unit, with about ½ inches of bark mulch on top.

One method of manufacture of this embodiment is to blow-mold high density polyethylene into a single shape comprising both containers, but with the upper container in an inverted position with its upper edge connected to the upper edge of the lower container. The single shape is then cut circumferentially to form the two containers, the initial shape being formed such that the upper portion may be inverted to fit snugly into the lower one.

Planters of the kind described may use about an inch of water each week, but this will vary depending on climatic conditions. Water levels should therefore be monitored regularly.

FIGS. 6 to 13 show a preferred method of manufacture of the preferred wick of the present invention. This method has the advantage of continuously producing extended lengths or strips of wick that are uniformly compacted for good water transport. These continuous lengths may be cut into shorter strips appropriate to the growing systems in which they will be used. Other major advantages include the great ability this wick has to transport moisture by capillary action. Wicking amounts of moisture useful for growing plants may be attained at moisture-lift heights of 18 inches using moist wicks.

The main component of the preferred wicks of this invention is long-fiber sphagnum moss. Sphagnum moss grows in bogs. It is familiar to gardeners in a processed form, which is largely used in making compost for growing water-loving plants, for seed germination, for mulching and for wrapping the roots of roses and other perennials before shipping them. Its value is based on its high absorbency and water holding capacity, which are due to its peculiar cell construction and spongelike texture.

As sphagnum moss comes from the bog it is long and stringy. For use as compost, seed germination and the like, it is pulverized or milled to very short pieces. As used herein, long-fiber sphagnum moss refers to sphagnum moss that has not been subjected to such treatment, though it may be coarsely shredded to tufts of about one and one-half inches to two and one-half inches across. The fibers themselves may typically range from about ½ inch to 4 inches in length, and 1½ to 2½ inches is preferable.

To make wicks of this invention, preferably long-fiber sphagnum moss is mixed using a paddle or other similar means in a large vat with an excess of water to separate the pieces of moss and make a slurry of oatmeal-like consistency. For example, a vat 2 to 3 feet deep may be used.

After the sphagnum moss slurry has been mixed in the vat, its long fibers become randomly oriented or omnidirectional, lying in various over-lapping directions. A sluice or other trough or spigot is then opened near the bottom of the vat. The sluice leads the slurry onto a moving, porous mat, preferably a polypropylene mesh netting 12, which is about 10 inches wide with openings about ⅝ inches to ¾ inches on a side. Much of the water drains away. Additional water is squeezed out of the slurry by passing the mesh carrying the sphagnum moss between rolls of a horizontal nip. The nip may have sides—for example, formed by sides on the upper roll (like a reel)—to prevent the sphagnum moss from being squeezed out the edges and to maintain it in the approximate shape shown in FIG. 8, where the moss is about ⅜ to ½ inches thick and 6 inches wide. During the process, water running off is constantly returned to the vat, and additional water and sphagnum moss are added to the vat as necessary.

Figure 6:
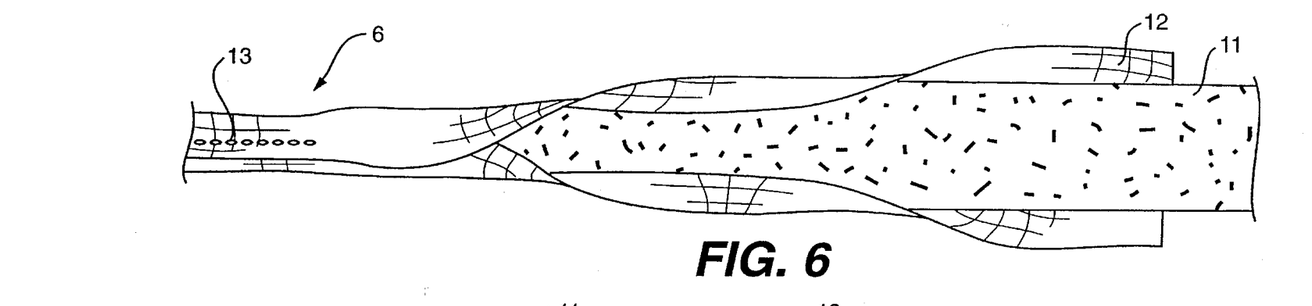
FIGS. 6 and 7 represent a method of manufacture of a wick of this invention, FIG. 6 being a top view and FIG. 7 being a side view.
Figure 7:
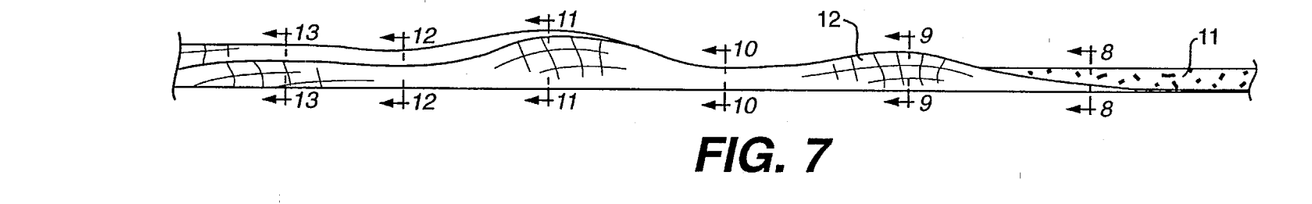
Figure 8:
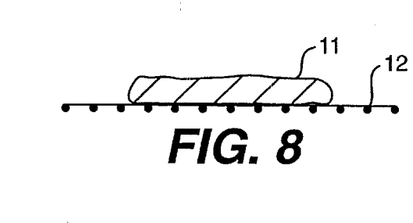
FIGS. 8 to 13 are cross sectional views of FIGS. 6 and 7 taken at lines 8—8, 9—9, 10—10, 11—11, 12—12 and 13—13, respectively.
Figure 9:
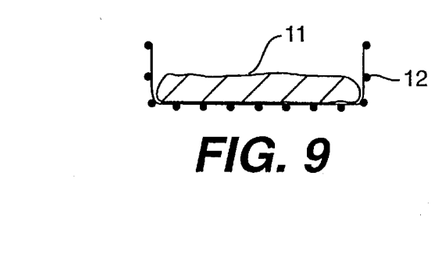
Figures 10, 11:
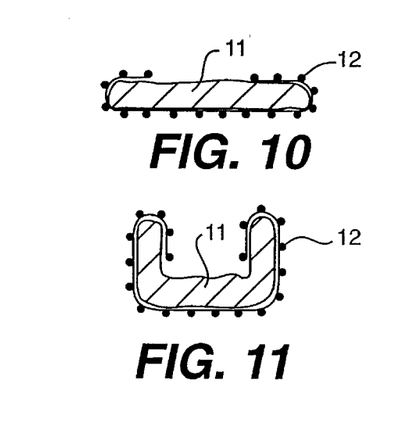
Figures 12, 13:
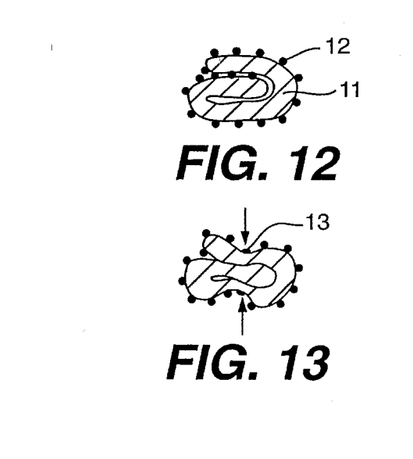

In a preferred method the netting is then folded around the edges of the moss strip by passing the combination through additional rollers and guides in any of various manners known in the machine process art to produce the cross sections shown in FIGS. 9 and 10. As the wick is led further along, additional rolls and guides of kinds known to those in the machine process art are then used to fold the combination to the configurations shown in FIGS. 11 and 12. That shape is then held in place by stitching 13, as shown in FIGS. 6 and 13. Stainless steel staples, synthetic filaments and the like may be used. The resulting extended, continuously produced length may be cut to shorter lengths appropriate to the planters or other growing systems in which they will be used.

The resulting wicks are easy to manufacture in high numbers, and they are highly efficient in transporting moisture. They are uniform in density as compared to stuffing by hand into a rigid tube, and they are omni-directional in the orientation of the long fiber sphagnum moss. The wick is also long lasting, since long-fiber sphagnum moss and properly selected plastics resist deterioration.

Figure 14:
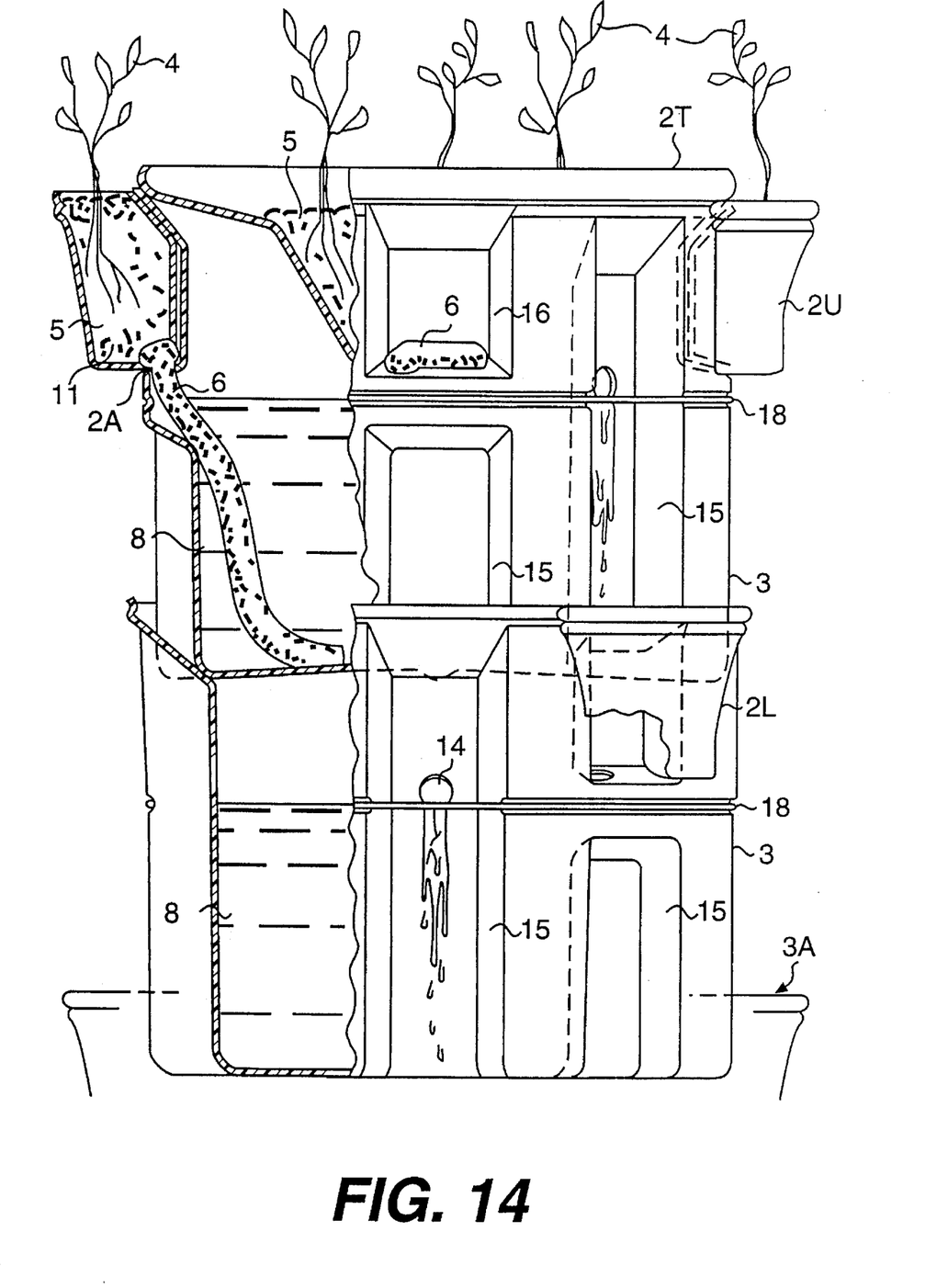
FIG. 14 is a side view, partially cut away, of a second embodiment of the invention of this application.

A further embodiment of the present invention is shown in FIG. 14. There, two containers 3 for liquid 8 are placed one on top of the other, and one partially inside the other. A third container 3 might be placed below the other two, as suggested by ghost lines 3A, which show the upper portion of a container shaped the same as the other two containers 3. Side containers 2U and 2L for growing medium are located around the outside edge of each container 3. Those on the upper container are designated 2U and those on the lower container, 2L. In addition, a single top container 2T may be placed on the upper 2U. The container 2T is shaped so that it may be blow molded, in an inverted position, as a integral part of container 3. The integral shape is then cut to form the upper edges of 2T and 3. 2T is inverted and, if properly shaped, will sit inside the upper part of 3. The side containers 2U and 2L are fastened, as by rivets 17, inside pockets 16. The pockets 16 and the containers 2U, 2L have openings 16A and 2A, respectively, through which wicks 6 are led to transport water 8 to growing medium 5 in 2U and 2L. The containers 2U and 2L are offset (see FIG. 15), such that maximum sun may reach each level.

The liquid containers 3 also contain orientation grooves or keyways 15. The grooves 15 of the upper container 3 rest in corresponding pockets 16 or grooves in the lower container 3. Each container 2U and 2L has additional sphagnum moss inserted at the bottom. The holes 14 act as fill and/or overflow holes. Preferably the uppermost container 3 is filled with water from a garden hose. As the water rises to the level of the hole 14, it overflows, spills out of hole 14, runs down on the outside of groove 15, and flows onto the upper, inner surface of pocket 16, from where it is deflected into the reservoir portion of the lower container 3. If several containers are placed one on top of each other, this will continue until all reservoirs 3 are filled to the same level. With this arrangement, rainwater that falls onto upper tiers may overflow into lower containers 3, helping to keep all tiers filled to the same level.

Figure 15:
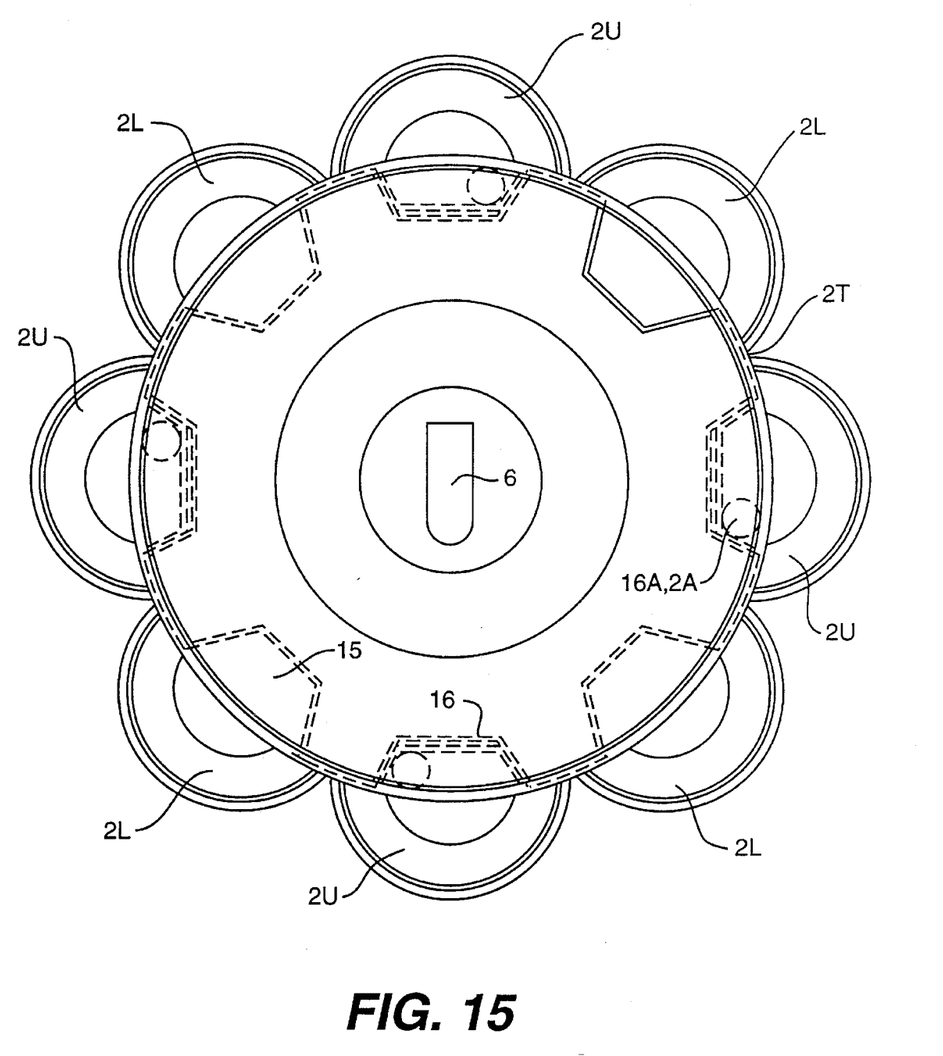
FIG. 15 is a top view of the embodiment of FIG. 14.
Figure 16:
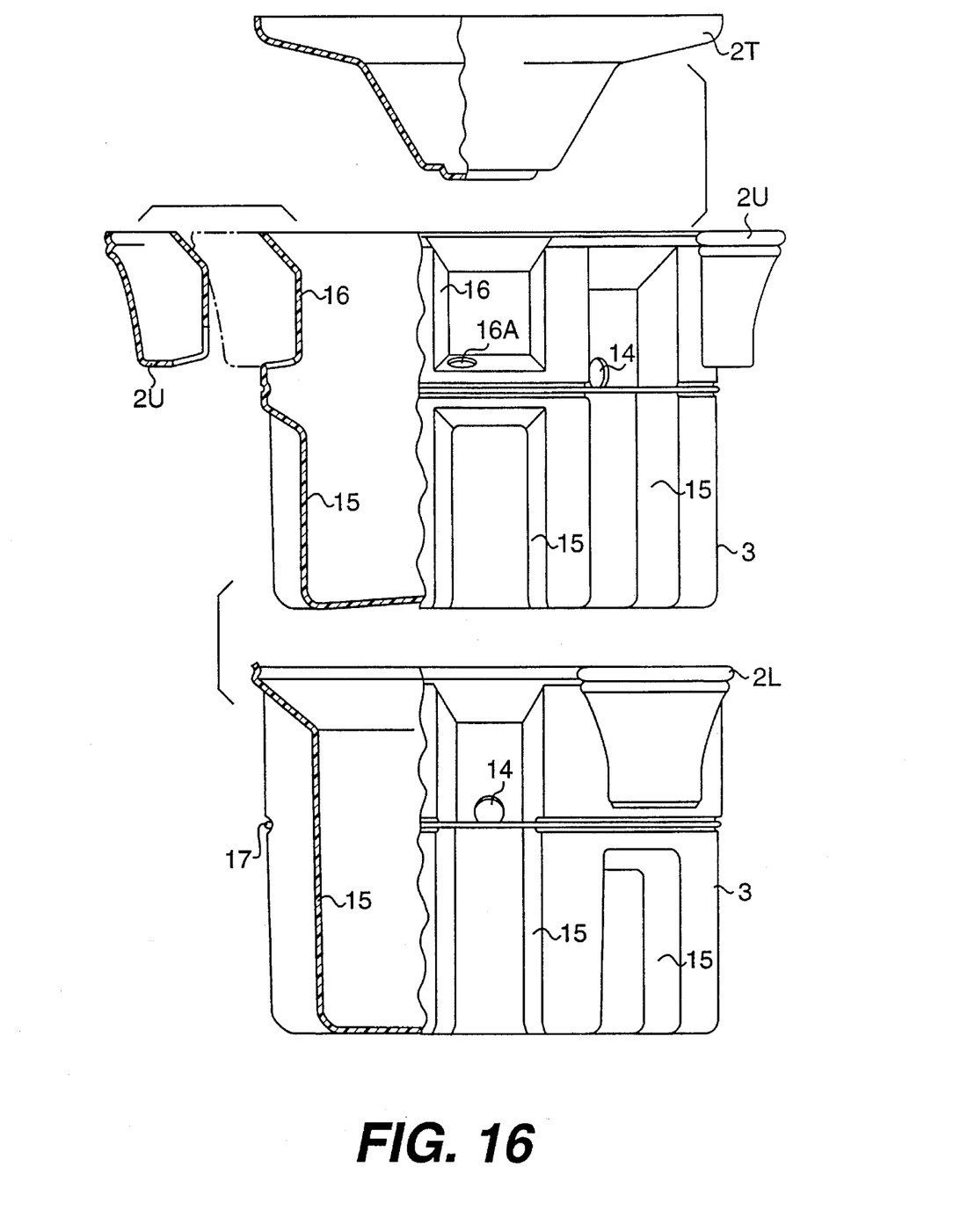
FIG. 16 shows the embodiment of FIG. 14 in which its parts are disassembled.

The growing medium materials in containers 2U and 2L are preferably like those used in container 2 in the embodiment of FIGS. 1 to 5. The top container 2T contains growing medium 5 and has a wick 6 led into it, as shown in FIG. 15.

Container 3 may be about 19 inches high with a stainless steel retaining ring 18 at about 11 inches high. The upper container 3 rests about 3 inches into the lower container 3. The containers 2U and 2L are about 7 inches high and the exposed portion of wick 6 in the openings 16A is about 2½ inches long.

The above description of various embodiments is not meant to limit the inventions described herein, which may be embodied in other forms.

What is claimed is:

1. A combination for a self-watering, self-contained growing system comprising:

a first container for holding liquid;

a second container for holding a growing medium comprising soilless mix; and a wick for being located with a lower portion in contact with a liquid of the first container and with an upper portion in contact with a lower portion of the growing medium of the second container, with said wick formed of long-fiber sphagnum moss arranged in a random orientation and held together by mesh.

2. The combination of claim 1 in which a first container for holding liquid supports a plurality of containers for holding growing medium around its edge, and the growing medium containers and wicks leading thereto from the liquid are located such that a second liquid container may be placed on the first liquid container.

3. The combination of claim 2 in which the second liquid container may be placed concentrically on the first liquid container.

4. A self-watering, self-contained planter comprising:

a container holding growing medium;

a container holding more than one gallon of liquid six or more inches deep, the liquid being located underneath the growing medium;

an air space between the growing medium and the liquid;

a wick comprising means for capillary transport of liquid connecting the liquid with a lower portion of the growing medium, with said wick formed of long-fiber sphagnum moss arranged in a random orientation and held together by mesh.

the wick being capable of transporting moisture by capillary action upwards six inches or more from the liquid to the lower portion of the growing medium;

the containers, the growing medium and the wick being arranged and comprising a combination for maintaining plants for four weeks or more without liquid replenishment.

5. The planter of claim 4, in which the growing medium consists essentially of soilless mix.

6. The planter of claim 4 in which the wick comprises a short length of wick made from a longer, extended, continuous length of wick.

* * * * *